US012694349B2

(12) United States Patent　　　　(10) Patent No.:　US 12,694,349 B2
Bell et al.　　　　　　　　　　　　 (45) Date of Patent:　　Jul. 28, 2026

(54) AUTOMATED INCENTIVIZING TOOL FOR CONTACT CENTER AGENTS

(71) Applicant: GENESYS CLOUD SERVICES, INC., Menlo Park, CA (US)

(72) Inventors: Cliff W. Bell, Menlo Park, CA (US); Daniel Stewart Stoops, Menlo Park, CA (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 127 days.

(21) Appl. No.: 18/387,915

(22) Filed: Nov. 8, 2023

(65) Prior Publication Data

US 2025/0148385 A1　　　May 8, 2025

(51) Int. Cl.
　　*G06Q 10/0631*　　　(2023.01)
　　*G06Q 10/0639*　　　(2023.01)
　　*G06Q 30/01*　　　　(2023.01)
(52) U.S. Cl.
　　CPC ................ *G06Q 10/063116* (2013.01); *G06Q 10/06393* (2013.01); *G06Q 30/01* (2013.01)
(58) Field of Classification Search
　　CPC ..... G06Q 10/063116; G06Q 10/06393; G06Q 30/01
　　See application file for complete search history.

(56) References Cited

U.S. PATENT DOCUMENTS

| | | | | |
|---|---|---|---|---|
| 8,396,732 | B1 * | 3/2013 | Nies | G06Q 10/06 |
| | | | | 705/7.22 |
| 8,675,860 | B2 * | 3/2014 | Eicholz | G06Q 50/2057 |
| | | | | 379/266.02 |
| 10,535,024 | B1 * | 1/2020 | Westland | G06Q 10/063116 |
| 11,558,506 | B1 * | 1/2023 | Cardillo | G10L 17/26 |
| 2005/0172027 | A1 * | 8/2005 | Castellanos | H04L 41/5009 |
| | | | | 707/999.1 |

(Continued)

FOREIGN PATENT DOCUMENTS

| | | | | |
|---|---|---|---|---|
| CA | 2564003 | A1 * | 4/2007 | G06Q 10/00 |

OTHER PUBLICATIONS

Gretz(https://www.mckinsey.com/~/media/mckinsey/business%20functions/operations/our%20insights/boosting%20contact%20center%20performance%20through%20employee%20engagement/boosting-contact-center-performance-through-employee-engagement.Pdf) (Year: 2018).*

*Primary Examiner* — Sujay Koneru
(74) *Attorney, Agent, or Firm* — Taft Stettinius & Hollister LLP

(57)　　　　　　ABSTRACT

A method for incentivizing contact center agents with scheduling perks that includes: receiving a workload forecast and staffing plan for a current shift; receiving a service level target; receiving types of scheduling perks; performing a selection routine for determining a select scheduling perk for offering to a select agent; and sending a scheduling perk offer via electronic communication to the select agent. The selection routine may include: selecting a proposed scheduling perks and a proposed agent; modifying the staffing plan to create a proposed staffing plan that reflects the proposed scheduling perk; predicting a proposed forecasted target adherence using the modified staffing plan; determining whether the proposed forecasted target adherence satisfies a threshold defined by an acceptable forecasted target adherence and, if so, deeming the proposed scheduling perk as select scheduling perk and proposed agent as select agent.

17 Claims, 5 Drawing Sheets

(56)            References Cited

U.S. PATENT DOCUMENTS

| | | | | |
|---|---|---|---|---|
| 2006/0020503 A1* | 1/2006 | Harris | .................... | G06Q 10/10 |
| | | | | 705/7.42 |
| 2006/0047556 A1* | 3/2006 | Lang | ............. | G06Q 10/063112 |
| | | | | 705/7.17 |
| 2006/0153356 A1* | 7/2006 | Sisselman | ........... | H04M 3/5233 |
| | | | | 379/265.12 |
| 2008/0059278 A1* | 3/2008 | Medina | ................. | G06Q 10/06 |
| | | | | 705/7.14 |
| 2010/0274596 A1* | 10/2010 | Grace | .................... | G06Q 10/10 |
| | | | | 705/7.15 |
| 2013/0090968 A1* | 4/2013 | Borza | .................... | G06Q 10/06 |
| | | | | 705/7.16 |
| 2014/0079207 A1* | 3/2014 | Zhakov | .............. | H04M 3/5233 |
| | | | | 379/265.03 |
| 2014/0169548 A1* | 6/2014 | McDaniel | ........... | H04M 3/5175 |
| | | | | 379/265.09 |
| 2014/0200941 A1* | 7/2014 | McDaniel | ...... | G06Q 10/063116 |
| | | | | 705/7.16 |
| 2014/0257900 A1* | 9/2014 | Jacobs | .......... | G06Q 10/063116 |
| | | | | 705/7.16 |
| 2015/0286982 A1* | 10/2015 | Dwyer | ................. | G06Q 10/067 |
| | | | | 705/7.17 |
| 2018/0101800 A1* | 4/2018 | Lecue | ............. | G06Q 10/06311 |
| 2018/0101809 A1* | 4/2018 | Bnayahu | ................ | G06Q 10/10 |
| 2019/0158671 A1* | 5/2019 | Feast | .................... | G06Q 10/10 |
| 2020/0394594 A1* | 12/2020 | Dvorscak, Jr. | ......... | G06Q 10/04 |
| 2021/0201246 A1* | 7/2021 | Krucek | .............. | H04M 3/5238 |
| 2022/0383230 A1* | 12/2022 | Mishra | .............. | G06Q 10/0633 |
| 2023/0394398 A1* | 12/2023 | Lin | ................. | G06Q 10/06312 |
| 2024/0020756 A1* | 1/2024 | Wayne | ............ | G06Q 10/06315 |

* cited by examiner

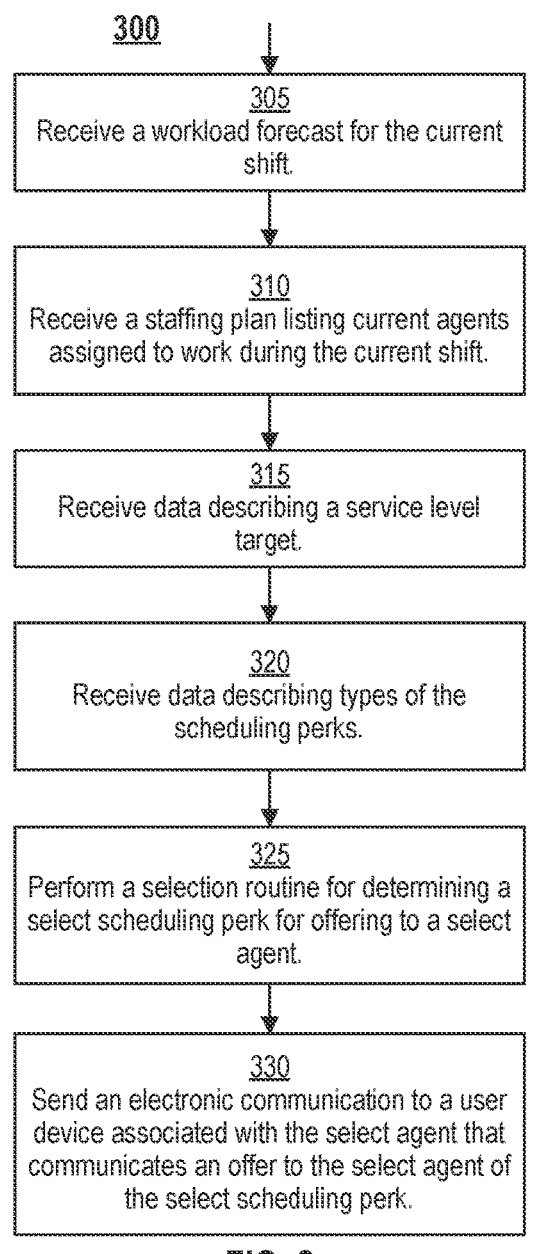

300

305
Receive a workload forecast for the current shift.

310
Receive a staffing plan listing current agents assigned to work during the current shift.

315
Receive data describing a service level target.

320
Receive data describing types of the scheduling perks.

325
Perform a selection routine for determining a select scheduling perk for offering to a select agent.

330
Send an electronic communication to a user device associated with the select agent that communicates an offer to the select agent of the select scheduling perk.

405
Select one of the types of the scheduling perks as a proposed scheduling perk and selecting one of the current agents as a proposed agent.

410
Modify the staffing plan to create a proposed staffing plan that reflects the proposed agent taking the proposed scheduling perk during the remaining portion of the current shift.

415
Provide the proposed staffing plan and the workload forecast as inputs to a predictive model and predicting therewith a proposed forecasted target adherence.

420
Determine whether the proposed forecasted target adherence satisfies a threshold defined by an acceptable forecasted target adherence.

FIG. 4

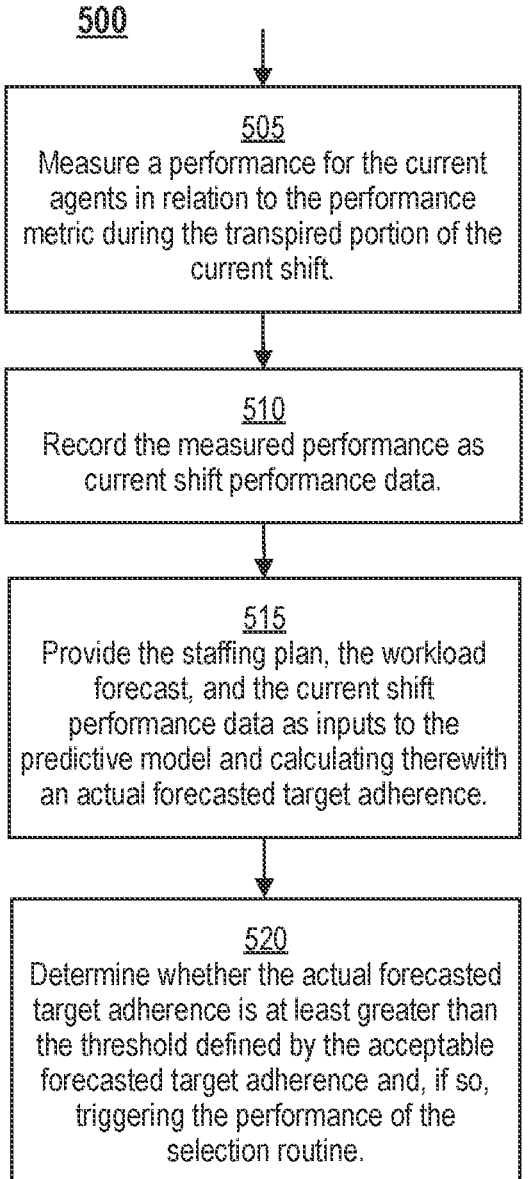

500

<u>505</u>
Measure a performance for the current agents in relation to the performance metric during the transpired portion of the current shift.

<u>510</u>
Record the measured performance as current shift performance data.

<u>515</u>
Provide the staffing plan, the workload forecast, and the current shift performance data as inputs to the predictive model and calculating therewith an actual forecasted target adherence.

<u>520</u>
Determine whether the actual forecasted target adherence is at least greater than the threshold defined by the acceptable forecasted target adherence and, if so, triggering the performance of the selection routine.

FIG. 5

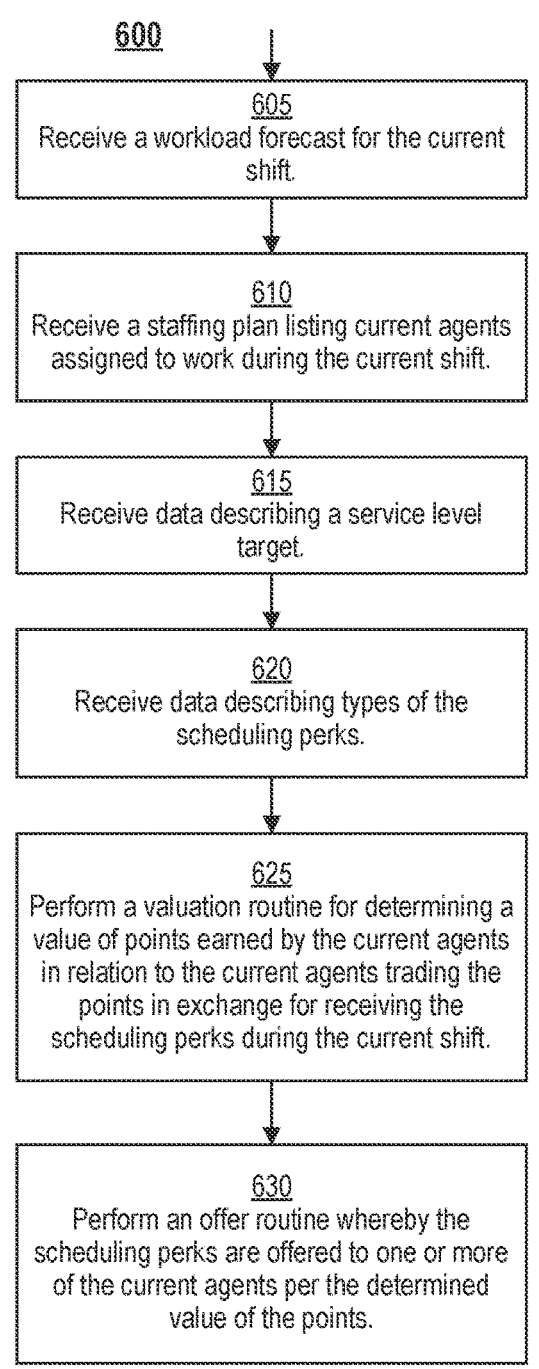
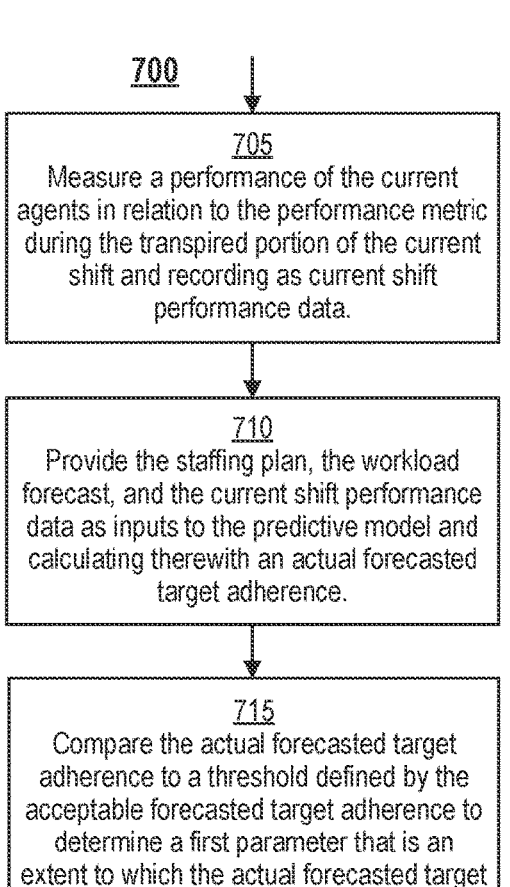
FIG. 6
FIG. 7

AUTOMATED INCENTIVIZING TOOL FOR CONTACT CENTER AGENTS

BACKGROUND

The present invention generally relates to customer relations services and customer relations management via contact centers and associated cloud-based systems. More particularly, but not by way of limitation, the present invention pertains to an automated tool for incentivizing contact center agents.

BRIEF DESCRIPTION OF THE INVENTION

The present invention describes a computer-implemented method for incentivizing agents of a contact center with scheduling perks. Each of the scheduling perks may include a desirable scheduling change applicable during a current shift. The current shift may be defined as an ongoing shift that includes a transpired portion and a remaining portion. The method may include the steps of: receiving a workload forecast for the current shift; receiving a staffing plan listing current agents assigned to work during the current shift; receiving data describing a service level target, the service level target defining a performance metric and a satisfying threshold score in relation to the performance metric; receiving data describing types of the scheduling perks; performing a selection routine for determining a select scheduling perk for offering to a select agent; and sending an electronic communication to a user device associated with the select agent that communicates an offer to the select agent of the select scheduling perk. The selection routine may include the steps of: selecting one of the types of the scheduling perks as a proposed scheduling perk and selecting one of the current agents as a proposed agent; modifying the staffing plan to create a proposed staffing plan that reflects the proposed agent taking the proposed scheduling perk during the remaining portion of the current shift; providing the proposed staffing plan and the workload forecast as inputs to a predictive model and predicting therewith a proposed forecasted target adherence that indicates a likelihood that the threshold score for the service level target will be achieved for the current shift; determining whether the proposed forecasted target adherence satisfies a threshold defined by an acceptable forecasted target adherence and, if so, deeming the proposed scheduling perk as the select scheduling perk and the proposed agent as the select agent.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein:

FIG. 3 is an exemplary method illustrating an agent incentivizing tool according to an exemplary embodiment of the present invention;

FIG. 4 is an exemplary method illustrating an exemplary embodiment of the selection routine of FIG. 3;

FIG. 5 is an exemplary method illustrating an exemplary trigger routine that can be used in accordance with the agent incentivizing tool of FIG. 3;

FIG. 6 is an exemplary method illustrating an agent incentivizing tool according to an alternative embodiment of the present invention;

FIG. 7 is an exemplary method illustrating an exemplary embodiment of the valuation routine of FIG. 6.

DETAILED DESCRIPTION

Figure 1:
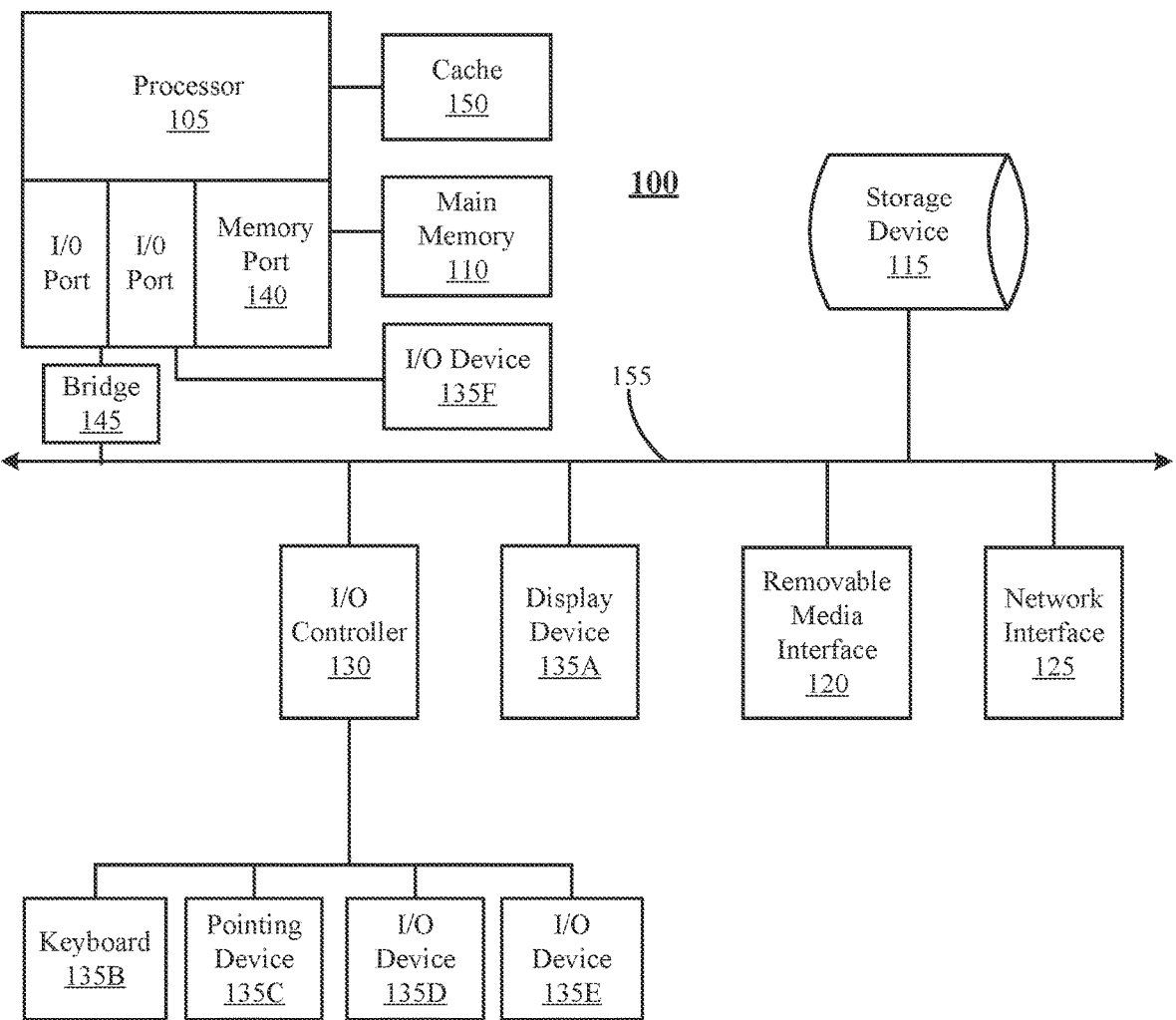
FIG. 1 depicts a schematic block diagram of a computing device in accordance with exemplary embodiments of the present invention and/or with which exemplary embodiments of the present invention may be enabled or practiced.

For the purpose of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art. Particular features, structures or characteristics may be combined in any suitable combinations and/or sub-combinations in one or more embodiments or examples. Those skilled in the art will recognize that various embodiments may be computer implemented using many different types of data processing equipment, with embodiments being implemented as an apparatus, method, or computer program product. Example embodiments, thus, may take the form of a hardware embodiment, a software embodiment, or combination thereof.

Computing Device

The present invention may be computer implemented using different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced.

The computing device 100, for example, may be implemented via firmware (e.g., an application-specific integrated circuit), hardware, or a combination of software, firmware, and hardware. Each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the processor 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. More generally, the I/O devices 135 may include any conventional devices for performing the functionality described herein.

Unless otherwise limited, the computing device 100 may be any workstation, desktop computer, laptop or notebook computer, server machine, virtualized machine, mobile or smart phone, portable telecommunication device, media playing device, or any other type of computing, telecommunications or media device, without limitation, capable of performing the operations and functionality described herein. The computing device 100 may include a plurality of such devices connected by a network or connected to other systems and resources via a network. Unless otherwise limited, the computing device 100 may communicate with other computing devices 100 via any type of network using any conventional communication protocol.

Contact Center Systems

Figure 2:
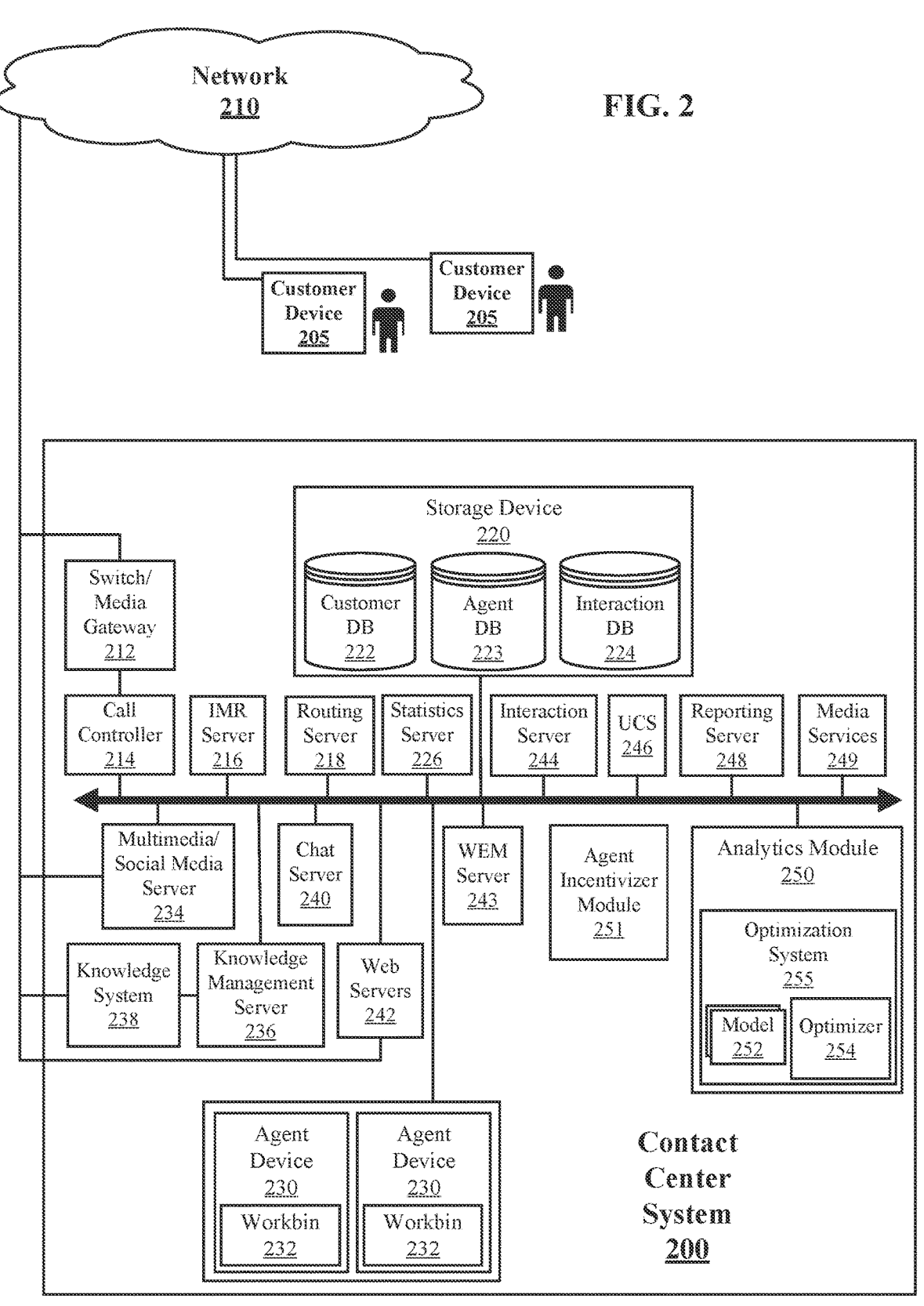
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system (or simply "contact center") 200 is shown in accordance with exemplary embodiments of the present invention and/or with which exemplary embodiments of the present invention may be enabled or practiced. By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between agents and customers may be conducted over a variety of communication channels, such as, for example, via voice (e.g., telephone calls or voice over IP or VOIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as interactive voice response (IVR) systems, interactive media response (IMR) systems, internet robots or "bots", automated chat modules or "chatbots", and the like.

Referring specifically to FIG. 2, the contact center 200 may be used by a customer service provider to provide various types of services to customers. For example, the contact center 200 may be used to engage and manage interactions in which automated processes (or bots) or human agents communicate with customers. The contact center 200 may be an in-house facility of a business or enterprise for performing the functions of sales and customer service relative to products and services available through the enterprise. In another aspect, the contact center 200 may be operated by a service provider that contracts to provide customer relation services to a business or organization. Further, the contact center 200 may be deployed on equipment dedicated to the enterprise or third-party service provider, and/or deployed in a remote computing environment such as, for example, a private or public cloud environment with infrastructure for supporting multiple contact centers for multiple enterprises. The contact center 200 may include software applications or programs, which may be executed on premises or remotely or some combination thereof. It should further be appreciated that the various components of the contact center 200 may be distributed across various geographic locations.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center 200 may include: a plurality of customer devices 205; communications network (or simply "network") 210; switch/media gateway 212; call controller 214; interactive media response (IMR) server 216; routing server 218; storage device 220; statistics server 226; plurality of agent devices 230 that each have a workbin 232; multimedia/social media server 234; knowledge management server 236 coupled to a knowledge system 238; chat server 240; web servers 242; interaction server 244; universal contact server (or "UCS") 246; reporting server 248; media services server 249; an analytics module 250; and an agent incentivizer module 251. It should be understood that any of the computer-implemented components, modules, or servers described in relation to FIG. 2 or in any of the following figures may be implemented via computing devices, such as the computing device 100 of FIG. 1. As will be seen, the contact center 200 generally manages resources (e.g., personnel, computers, telecommunication equipment, etc.) to enable the delivery of services via telephone, email, chat, or other communication mechanisms. The various components, modules, and/or servers of FIG. 2 (and other figures included herein) each may include one or more processors executing computer program instructions and interacting with other system components for performing the various functionalities described herein. Further, the terms "interaction" and "communication" are used interchangeably, and generally refer to any real-time and non-real-time interaction that uses any communication channel including, without limitation, telephone calls (PSTN or VOIP calls), emails, voicemails, video, chat, screen-sharing, text messages, social media messages, WebRTC calls, etc. Access to and control of the components of the contact system 200 may be affected through user interfaces (UIs) which may be generated on the customer devices 205 and/or the agent devices 230.

Customers desiring to receive services from the contact center 200 may initiate inbound communications (e.g., telephone calls, emails, chats, etc.) to the contact center 200 via a customer device 205. While FIG. 2 shows two such customer devices it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center 200, such as telephone calls, emails, chats, text messages, web-browsing sessions, and other multi-media transactions. Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access network, global system for mobile communications (GSM) network, or any wireless network/technology conventional in the art.

The switch/media gateway 212 may be coupled to the network 210 for receiving and transmitting telephone calls between customers and the contact center 200. The switch/media gateway 212 may include a telephone or communication switch configured to function as a central switch for agent routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. In general, the switch/media gateway 212 establishes a voice connection between the customer and the agent by establishing a connection between the customer device 205 and agent device 230. The switch/media gateway 212 may be coupled to the call controller 214 which, for example, serves as an adapter or interface between the switch and the other routing, monitoring, and communication-handling components of the contact center 200. The call controller 214 may be configured to process PSTN calls, VOIP calls, etc. The call controller 214 may include computer-telephone integration (CTI) software for interfacing with the switch/media gateway and other components. The call controller 214 may extract data about an incoming interaction, such as the customer's telephone number, IP address, or email address, and then communicate these with other contact center components in processing the interaction.

The interactive media response (IMR) server 216 enables self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. Through continued interaction with the IMR server 216, customers may receive service without needing to speak with an agent. The IMR server 216 may ascertain why a customer is contacting the contact center so to route the communication to the appropriate resource.

The routing server 218 routes incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230, which may enhance the service the agent is able to provide.

Regarding data storage, the contact center 200 may include one or more mass storage devices—represented generally by the storage device 220—for storing data in one or more databases. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center 200 may include agent availability and agent profiles, schedules, skills, average handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center 200 in ways that facilitate the functionality described herein. For example, the servers or modules of the contact center 200 may query such databases to retrieve data stored therewithin or transmit data thereto for storage.

The statistics server 226 may be configured to record and aggregate data relating to the performance and operational aspects of the contact center 200. Such information may be compiled by the statistics server 226 and made available to other servers and modules, such as the reporting server 248, which then may produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center 200 to facilitate the functionality described herein. An agent device 230, for example, may include a telephone adapted for regular telephone calls or VOIP calls. An agent device 230 may further include a computing device configured to communicate with the servers of the contact center 200, perform data processing associated with operations, and interface with customers via voice, chat, email, and other multimedia communication mechanisms according to functionality described herein. While only two such agent devices are shown, any number may be present.

The multimedia/social media server 234 may be configured to facilitate media interactions (other than voice) with the customer devices 205 and/or the servers 242. Such media interactions may be related, for example, to email, voicemail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 234 may be configured to facilitate interactions between customers and the knowledge system 238. In general, the knowledge system 238 may be a computer system capable of receiving questions or queries and providing answers in response. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

The chat server 240 may be configured to conduct, orchestrate, and manage electronic chat communications with customers. Such chat communications may be conducted by the chat server 240 in such a way that a customer communicates with automated chatbots, human agents, or both. The chat server 240 may perform as a chat orchestration server that dispatches chat conversations among chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature. The chat server 240 may be configured to transfer chats within a single chat session with a particular customer between automated and human sources. The chat server 240 may be coupled to the knowledge management server 234 and the knowledge systems 238 for receiving suggestions and answers to queries posed by customers during a chat so that, for example, links to relevant articles can be provided.

The web servers 242 provide site hosts for a variety of social interaction sites to which customers subscribe, such as Facebook, Twitter, Instagram, etc. Though depicted as part of the contact center 200, it should be understood that the web servers 242 may be provided by third parties and/or maintained remotely. The web servers 242 may also provide webpages for the enterprise or organization being supported by the contact center 200. For example, customers may browse the webpages and receive information about the products and services of a particular enterprise. Within such enterprise webpages, mechanisms may be provided for initiating an interaction with the contact center 200, for example, via web chat, voice, or email. An example of such a mechanism is a widget, which can be deployed on the webpages or websites hosted on the web servers 242. As used herein, a widget refers to a user interface component that performs a particular function. In some implementations, a widget includes a GUI that is overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Such widgets may include additional user interfaces and be configured to access a variety of local resources (e.g., a calendar or contact information on the customer device) or remote resources via network (e.g., instant messaging, electronic mail, or social networking updates).

The interaction server 244 is configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

The universal contact server (UCS) 246 may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer, such as data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to a request and used toward managing the contact center in accordance with functionality described herein.

The media services server 249 provides audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, audio and video transcoding, secure real-time transport protocol (SRTP), audio or video conferencing, call analysis, keyword spotting, etc.

The analytics module 250 is generally configured to perform analytics on data received from a plurality of different data sources as functionality described herein requires. The analytics module 250 also may generate, update, train, and modify predictive models (or simply "models") 252 based on collected data, such as, for example, customer data, agent data, and interaction data. The models 252 may include behavior models of customers or agents that predict behavior in a variety of situations, thereby allowing interactions to be personalized and resources better allocated so to improve both contact center performance and customer experience. While the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed below, the analytic module 250 may be configured to retrieve data stored within the storage device 220 for use in developing and training algorithms and models 252, for example, by applying machine learning algorithms.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear, as nonlinear models can better represent curved rather than straight-line relationships. Given the foregoing requirements, a machine learning or neural network-based approach is presently a preferred embodiment for implementing the models 252. Neural networks, for example, may be developed based upon empirical data using advanced regression algorithms. The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like. The models 252 may further include time series forecasting models. According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to the automated processes described herein.

The agent incentivizer module 251 is configured to provide functionality related to, particularly in regard to an automated tool for incentivizing contact center agents. The agent incentivizer module 251 may achieve this by orchestrating other components, servers, and modules of a contact center and the data related thereto, such as those components, servers, and modules described above in relation to the example contact center 200, so to provide the functionality described herein, as would be understood by one of ordinary skill in the art. The functionality related to the agent incentivizer module 251, which may also be referred to generally as an agent incentivizer, will be described in greater detail in the section below.

Automated Tool for Incentivizing Agents

Turning now to FIGS. 3-7, the functionality of the agent incentivizer will now be further described in accordance with example embodiments of the present invention. Before proceeding with this, though, some background as to how a contact center functions will be provided while also highlighting some operational shortcomings that the present invention is intended to address.

In general, the operational environment of contact centers is a very dynamic one, as workload often varies greatly. While forecasting workload has improved, variability over the short term remains difficult to predict, as the number of customers contacting a contact center at any one time can randomly cycle between peaks and valleys throughout the course of a shift. Within this chaotic environment, contact center supervisors are challenged with the difficult task of maintaining labor cost-effectiveness while also making sure that sufficient agents are available to serve demand in accordance with specifically defined service level targets. Service level targets, are performance standards that are typically spelled out in what is generally referred to as a service level agreement (SLA). SLAs define standards in the form of service level targets that agents are expected to satisfy when handling customer interactions.

Contact centers may determine their own SLAs internally or, when the contact center contracts with a business to provide customer relation services to the customers of that business, SLAs—and the service level targets that it includes—may be negotiated as part of that contract arrangement. The rate at which those service level targets are met is referred to as the contact center service level. For example, service level targets may specify that 80% of calls are answered prior to three rings, 90% of chats are accepted within 10 seconds, 100% of emails are responded to within 24 hours, etc. The service level targets for a contact center may further include, for example, average time to respond, average handle time (AHT), first-call resolution, average time to resolution (ATTR), abandonment rate, maximum hold times for customers, customer satisfaction rating, among other key performance indicators (KPIs) of contact centers. Failure to meet the requirements of a SLA by failing to satisfy service level targets may result in financial penalties for the contact center. In addition to the SLA, the contact center is trying to reduce agent churn by maintaining a positive work environment and reasonable workload expectations.

To satisfy all these operational requirements, contact centers must maintain a group of well-trained, experienced agents. This, however, typically proves to be difficult given the high turnover rate with agents in contact centers. To combat this, contact centers generally have found that providing incentives and rewards for good performance promotes long term loyalty and commitment. Along these lines, contact centers have found that among the most effective incentives are those relating to an agent's work schedule. These types of incentives—which may be referred to herein generally as "scheduling perks"—are geared to provide agents with certain advantages, desirable changes, or flexibility related to the schedule they are required to work. Conventional systems of contact centers generally do not maximize the beneficial impact that scheduling perks could bring. Conventional systems typically require that an agent make a schedule change request and then have the request evaluated by a shift supervisor. The supervisor may review the agent's performance and compare that against the contact center forecasted workload. As a result, scheduling changes generally happen at the initiation of the agent and often are negotiated in person between the supervisor and agent. Further, in deciding whether to approve the request, it is virtually impossible for the supervisor to make an informed and timely decision given the many variables that have to be considered. This approach ends up being expensive and inefficient. Further, it is not proactive and, thus, fails to recognize real-time cost-effective opportunities to incentivize agents. This is primarily due to both supervisors and agents lacking necessary information. For example, a supervisor may not realize that current conditions make offering a scheduling perk cost-effective and low-risk from the perspective of the contact center because it is likely not to jeopardize service level targets. Likewise, agents are generally not aware as to when requesting a scheduling perk is more advisable.

Depending on the nature of the scheduling perk, both long term and short term operations or staffing plans can be affected. For example, some scheduling perks concern long term staffing plans. These types of scheduling perks, for example, may grant an agent priority in selecting shifts to work over the upcoming month, deciding whether to work on a particular holiday, or scheduling time-off for holiday. Other scheduling perks are more immediate in impact and affect short term operations. These types of scheduling perks, for example, may affect an agent's work schedule over the completion of the current or ongoing shift. Examples of these types of scheduling perks include an extra break, extended lunch period, earlier end to the shift, later start to the shift, etc. However, given the dynamic operations environment of contact centers, it becomes a challenged to intelligently award these short term type of scheduling perks, particularly in ways that both maximize their beneficial effect toward increasing agent happiness, while also minimizing any negative operational effects that could otherwise impact whether service level targets are met.

In order to make the process of agent scheduling changes—including the offering of scheduling perks—more efficient, the present disclosure describes methods and systems for incentivizing agents, which may be referred to herein generally as an agent incentivizer module or, simply, "agent incentivizer". As will be seen, the present agent incentivizer provides enabling systems and methods for making informed, real-time agent schedule changes that take into account contact center performance requirements so that satisfying service level targets is ensured (or, at least, within an approved likelihood). Alternative embodiments of the agent incentivizer further provide ways to proactively offer scheduling perks to agents when short term conditions indicate that it is advantageous for the contact center to do so. This may occur, for example, when a recent stretch of high performance during a shift results in the accrual of a buffer that makes offering particular scheduling perks particularly low risk in terms of affecting whether service level targets are satisfied. Or when a temporary lull in customer activity creates favorable SLA results. In another example embodiments, the present agent incentivizer creates a dynamic exchange where agents can purchase scheduling perks via a currency or points that are awarded for high performance. In this case, as will be seen, the "price" of such perks for an agent may be dynamically varied in accordance with a valuation routine that assess the contact center's current standing in relation to how likely it is to satisfy service level targets.

To provide the above functionality, embodiments of the present invention may require several types of data inputs. As will be appreciated, much of this data is already tracked and made available in contact center platforms as part of current features and applications, with many of these being part of an operational area that is commonly referred to as workforce engagement management (WEM), which is introduced above in relation to WEM Server 243 of FIG. 2. As will be appreciated, WEM focuses on assisting contact centers to improve and manage employee engagement. WEM is defined by functionality supporting recruiting and onboarding, evaluation and improvement, time management, task management and metrics, and recognition. Areas included in WEM include workforce management (WFM) and workforce optimization (WFO), as well as recording, text and speech analytics, quality monitoring, performance management, and gamification.

Focus will now turn toward the particular types of data inputs used by the several embodiments of the agent incentivizer. Once those are introduced, a description will follow that covers exemplary operation, which will be centered around two general types of embodiments. A first type of agent incentivizer, as shown in FIGS. 3-5, relates to one that monitors conditions during a current shift to determine in realtime scheduling perks for offering to agents that do not risk satisfying service level targets. These scheduling perks can then be proactively offered to the agents. A second type of agent incentivizer, as covered in relation to FIGS. 6-7, relates to one that creates an exchange where points earned by the agents are dynamically valued in relation to current conditions. The dynamic valuation is tied to the contact center's current standing in relation to how likely it is to satisfy service level targets. The agents are informed of the present valuation of their earned points and are allowed to "purchase" scheduling perks in accordance with that valuation.

In regard to exemplary data inputs of the present agent incentivizer, one of the data inputs is data describing current agent work schedules and/or agent staffing plan, which may be referred to herein generally as an agent staffing plan (or simply "staffing plan"). The staffing plan of the contact center may include the current work schedule for each agent. Such work schedules may include the shifts that each agent is currently assigned to work. The agent staffing plan may provide overall staffing plans for the contact center, which, for example, may include a listing of the agents assigned to work during particular shifts. Such shift schedules may include each of the agents that are assigned to work during a current shift as well as any upcoming shift.

In accordance with exemplary embodiments, another one of the data inputs is data describing the gamification points (or simply "points") that have been awarded to and available for use by each of the agents. As will be appreciated, many contact centers allot points as an award for high performance and track accrued points as a way to motivate and engage agents. In certain systems, such points are tracked and available to the agents to trade for certain perks. In the present system, as will be seen, agents may trade such points for scheduling perks per a dynamic valuation of those point in relation to the scheduling perks. As will be appreciated, many conventional contact center systems provide gamification functionality that may be used to award points and track earned points for each of the agents. Such gamification tools regularly convert raw analytical performance data into points for the agents, with the metrics used to calculate gamification points including contact center KPIs such as any of the mentioned herein. For example, in relation to a particular metric, gamification systems may define ranges of values, or zones, within the metric and then associate point values that create objectives for agents. The agents scoring is then compared to the applicable zones in order to translate the scores into points. In addition, game mechanics can be layered on top of the awarded points to further engage and motivate employees to achieve their own goals as well as the goals of the contact center. An agent's points are recorded and maintained by the gamification system. In conventional systems, such points are then used to rank the agents or justify an award provided by a supervisor. The present invention may use such earned points as part of an automated incentivizer as is described in the functionality provided below.

In accordance with exemplary embodiments, another one of the data inputs is data describing a workload forecast for the contact center. As used herein, a workload forecast refers to a forecast of the services that the contact center will provide to customers over a future work period, such as during a current shift or an upcoming shift. As an example, the workload forecast may predict an expected call volume that a contact center will receive over a shift. Such predictions may be broken down into subperiods defined within the shift, such as by the hour or portion thereof. Thus, for example, a workload forecast may provide an expected call volume for each remaining hour or half-hour increment in the current shift. Additional information related to predicting workload forecasts is provided in U.S. application Ser. No. 18/207,311, filed on Jun. 8, 2023, entitled "Improved Single Model Workload Forecasts Covering Both Longterm and Shorterm Contact Center Operating Horizons", the content of which is incorporated herein by reference.

In accordance with exemplary embodiments, another one of the data inputs is data describing applicable service level targets. As stated, service level targets are performance goals of the contact center as specifically defined via performance metrics. As described above, service level targets may be defined for a contact center in a service level agreement (SLA) that mandates certain minimum performance targets in relation to particular performance metrics, with those metrics intended to provide measures as to how well various services are delivered to customers. As used herein, reference to a service level target may include the applicable performance metric as well as a satisfying threshold score in relation to the applicable performance metric.

Additionally, the agent incentivizer of the present invention may function in relation to certain derived data elements. For example, in accordance with exemplary embodiments, one of the derived data elements is data describing an actual forecasted target adherence. As used herein, the actual forecasted target adherence is a prediction as to the likelihood that one or more subject service level targets will be satisfied in relation to a particular operating period, which, for example, may be the current operating period or current shift. For example, during the current shift, a predictive model may be fed input data describing relevant parameters, such as present staffing conditions and workload forecasted for the remainder of the shift, and then used to calculate the likelihood that the service level target will be satisfied. The predictive model may predicate such predictions on learned patterns in historic data matching levels of performance to available agents and workload. For example, the predictive models may include a machine learning algorithm that is trained on past data of the contact center. As described in more detail below, the input data for such predictions may also include how the contact center performed in relation to the subject service level targets during a transpired portion of the current shift (i.e., the portion of the current or ongoing shift that has already transpired). Additional information related to predicting service level target adherence is provided in U.S. Pat. No. 9,906,648, issuing on Feb. 27, 2018, to the assignee of the present application, entitled "Method and System for Prediction of Contact Allocation, Staff Time Distribution, and Service Performance Metrics in a Multi-skilled Contact Center Operation Environment", the content of which is incorporated herein by reference. Note the "actual forecasted target adherence" is differentiated from a "proposed forecasted target adherence" in that the "actual" is a prediction that does not assume the inclusion of any scheduling perks, i.e., the prediction if no scheduling perks occur, whereas, as discussed below, the "proposed" assumes the inclusion of one or more proposed scheduling perks in order to determine their impact.

In accordance with exemplary embodiments, another one of the derived data elements is data describing an acceptable forecasted target adherence. As used herein, the acceptable forecasted target adherence is the threshold at which the probability of satisfying the subject service level targets is deemed acceptable. In exemplary embodiments, this threshold may be one that is received as an input from a contact center supervisor so that it reflects the level of risk of nonadherence the supervisor is willing to accept in relation to the subject service level targets. As will be seen, one way that the acceptable forecasted target adherence may be used is to determine when scheduling perks are offered to agents or, at least, when the agent incentivizer explores options as to what scheduling perks are possible.

In accordance with exemplary embodiments, another one of the derived data elements is data describing the types of scheduling perks that are available for offering to agents by the agent incentivizer. Each type of the scheduling perk is intended to provide an advantageous scheduling change that would be desirable to agents. Thus, examples of the different types of scheduling perks include an extra break during a shift, extended time for a regular break, longer lunch break, early leave time for a shift, etc. As discussed below, once the agent incentivizer selects a particular type of scheduling perk for analysis as to whether it can be offered to an agent, the selected scheduling perk may be referred to as a "proposed scheduling perk". Each type of scheduling perk may be associated with a particular number of lost agent-hours. For example, a scheduling perk that provides an extra 30 minute break for an agent may be associated with 0.5 lost agent-hours for the shift in which it is applied.

In accordance with exemplary embodiments, another one of the derived data elements is data describing a proposed forecasted target adherence. As used herein, the proposed forecasted target adherence refers to a prediction as to the likelihood that subject service level targets will be satisfied given the impact of one or more proposed scheduling perks (and the assumed loss of the associated agent-hours). For example, this may include a prediction as to whether the subject service level targets will be satisfied during the current operating period or shift. As before, during the current shift, a predictive model may be fed input data describing relevant parameters, such as present staffing conditions and workload forecasted for the remainder of the shift, and then used to calculate the likelihood that service level target will be satisfied. In this case, however, the present staffing conditions may be modified to reflect the one or more proposed scheduling perks. For example, the present staffing conditions may be modified to reflect the lost agent-hours associated with the one or more proposed scheduling perks. In this way, the agent incentivizer of the present invention calculates the effect that the proposed scheduling perks will have on the likelihood of satisfying the service level target.

In accordance with exemplary embodiments, another one of the derived data elements is data describing a valuation parameter, the functionality of which will be discussed more in relation to FIGS. 6 and 7. As used herein, the valuation parameter may reflect an extent to which actual forecasted target adherence exceeds the threshold defined by the acceptable forecasted target adherence. As will be appreciated, as that gap widens, the favorability of offering scheduling perks also increases from the point of view of the contact center. Thus, as will be seen, the size of that differential proves an effective way to value the points that the agents can use to trade for the scheduling perks. Thus, the points may be valued according to a direct relationship with the valuation parameter so that as the valuation parameter increases—i.e., as the gap widens—the value of the earned points increases relative to the scheduling perks. This means that it would take less points to purchase a scheduling perk. As the valuation parameter decreases, the reverse takes place as the value of the points decreases. In exemplary embodiments, the mathematical relationship between the valuation parameter and the points may be further defined as being linear or proportional. Non-linear relationships can also be used. Further, maximum and minimum constraints can be added.

With general reference now to FIGS. 3-5, the first type of agent incentivizer will be discussed in more detail. The embodiments associated with this type of agent incentivizer monitor changing conditions during a current shift to determine in real-time favorable scheduling perks for offering to agents. Such favorable scheduling perks are determined to not unduly risk satisfying service level targets, with supervisors being able to define acceptable risk levels. As will be seen, this type of agent incentivizer The scheduling perks can then be proactively offered to the agents via an automated offer-acceptance routine.

With specific reference now to FIG. 3, a method 300 is provided that illustrates exemplary functionality of an agent incentivizing tool according to the present invention. The method 300 may be used to proactively incentivize agents of a contact center with scheduling perks. In relation to the current exemplary embodiment, a scheduling perk may be defined as a desirable scheduling change that is applicable during a current shift. The current shift, as used herein, may be defined as an ongoing shift. The current shift, thus, may include a portion that has already transpired, which may be referred to as a "transpired portion", and a portion that is still remaining, which may be referred to as a "remaining portion".

The method 300 may begin, at step 305, via the act of receiving a workload forecast for the current shift. In an exemplary embodiment, the workload forecast may include a prediction as to a total services provided by the current agents over the remaining portion of the current shift as broken down into subtotals of the total services expected to occur within respective subperiods defined within the remaining portion of the current shift.

The method 300 may then continue, at step 310, via the act of receiving a staffing plan listing current agents assigned to work during the current shift.

The method 300 may then continue, at step 315, via the act of receiving data describing a service level target. As used herein, the service level target defines both a performance metric and a satisfying threshold score in relation to the performance metric. In exemplary embodiments, the performance metric of the service level target may include a performance metric that is objectively measurable and relates to a manner in which an agent of the current agent delivers a service to a given customer during a given interaction. In exemplary embodiments, the service being delivered is conducted by a voice call with the customer, and the performance metric relates to an aspect of the voice call. In exemplary embodiments, a score for the performance metric over the current shift may be calculated as an average of scores derived from respective interactions handled by the current agents over the current shift. In exemplary embodiments, the performance metrics may relate to a predetermined percentage of voice calls answered prior to a predetermined number of rings, a predetermined percentage of chats accepted within a predetermined number of seconds, a predetermined percentage of emails responded to within a predetermined time period, an average handle time for voice calls, and a predetermined percentage of first-call resolutions. The performance metric may include other contact center operational metrics.

The method 300 may then continue, at step 320, via the act of receiving data describing types of the scheduling perks. The types of scheduling perks may include a perk that extends a break period, provides an extra break period, and/or allows for an early end to the current shift. The data describing each type of scheduling perk may include an associated number of lost agent-hours for each.

The method 300 may then continue, at step 325, via the act of performing a selection routine for determining a select scheduling perk for offering to a select agent, which will be described in more detail with reference to the method 400 of FIG. 4.

The method 300 may then continue, at step 330, via the act of sending an electronic communication to a user device associated with the select agent that communicates an offer to the select agent of the select scheduling perk. The electronic communication may be included within a chat or text message, a UI element provided within an agent dashboard, an email, a widget, and the like.

With specific reference now to FIG. 4, a method 400 is shown that illustrates an exemplary embodiment of the selection routine mentioned above in the method 300 of FIG. 3.

The method 400 may begin, at step 405, via the act of selecting one of the types of the scheduling perks as a proposed scheduling perk and selecting one of the current agents as a proposed agent. In exemplary embodiments, the selection of one of the current agents as the proposed agent may include selecting an agent based on performance. In such cases, the method may include the steps of measuring a performance for how each of the current agents has performed in relation to the performance metric during the transpired portion of the current shift. The current agent then may be ranked in relation to the measured performance. The selection of one of the current agents may then be based on that agent being ranked higher than at least a majority of the other current agents. In some embodiments, the highest ranking agent may be selected as the proposed agent.

The method 400 may then continue, at step 410, via the act of modifying the staffing plan to create a proposed staffing plan that reflects the proposed agent taking the proposed scheduling perk during the remaining portion of the current shift.

The method 400 may then continue, at step 415, via the act of providing the proposed staffing plan and the workload forecast as inputs to a predictive model and predicting therewith a proposed forecasted target adherence that indicates a likelihood that the threshold score for the service level target will be achieved for the current shift. As will be appreciated, the likelihood provided in the proposed forecasted target adherence reflects a likelihood of achieving the service level target while assuming the work schedule of the proposed agent is modified by the proposed scheduling perk. In exemplary embodiments, the selection routine may further include providing current shift performance data as an input to the predictive model for use in predicting the proposed forecasted target adherence. In such cases, the method may further include the steps of measuring a performance for the current agents in relation to the performance metric during the transpired portion of the current shift, with the measured performance being recorded as the current shift performance data.

The method 400 may then continue, at step 415, via the act of determining whether the proposed forecasted target adherence satisfies a threshold defined by an acceptable forecasted target adherence and, if so, deeming the proposed scheduling perk as the select scheduling perk and the proposed agent as the select agent. In example embodiments, the acceptable forecasted target adherence may be received as a user input from a user device associated with a supervisor of the contact center. In example embodiments, if the proposed forecasted target adherence is determined to not satisfy the threshold defined by an acceptable forecasted target adherence, the selection routine may be repeated to determine the select scheduling perk for offering to the select agent. In such cases, the repetition of the selection routine proceeds with a different type of scheduling perk, a different one of the current agents, or both a different type of scheduling perk and a different one of the current agents. That is, the selection routine is repeated with an alternative one of the types of the scheduling perks may be selected as the proposed scheduling perk, and/or an alternative one of the current agents may be selected as the proposed agent.

In exemplary embodiments, the method may further include the step of receiving a reply electronic communication from the select agent that either accepts or declines the offered scheduling perk. If the reply indicates an acceptance of the offer, the method may proceed by updating the staffing plan. Specifically, the staffing plan for the remaining portion of the current shift may be automatically updated to reflect that the work schedule of the select agent during the current shift includes the select scheduling perk. If the reply indicates that the offer has been declined, the method may proceed by repeating the selection routine. Specifically, the selection routine may be repeated using the same proposed scheduling perk and an alternative one of the current agents as the proposed agent.

In example embodiments, a trigger routine may be used in conjunction with an agent incentivizer of the present invention. With specific reference now to FIG. 5, a method 500 is shown that illustrates an exemplary embodiment of a trigger routine. In general, a trigger routine is a process that monitors present conditions to determine when it is favorable to calculate proposed scheduling perks for potentially finding a scheduling perk to offer to an agent. As will be appreciated, it may not make sense to use resources to calculate proposed scheduling perks when the actual forecasted target adherence is less than the threshold defined by the acceptable forecasted target adherence. This is because any proposed scheduling perk results in lost agent-hours that act negatively on the actual forecast target adherence. If the actual forecasted target adherence is already below an acceptable threshold, there is no chance for a proposed scheduling perk to be approved. Thus, according to one aspect, the trigger routine is used to prevent needless calculation of proposed scheduling perks by the selection routine. The trigger routine provided in the method 500 can be used in accordance with the agent incentivizing disclosed in the method 300 of FIG. 3. Further, the trigger routine may also be used in relation to the agent incentivizer disclosed in the method 600, which is discussed below.

The method 500 may begin, at step 505, via the act of measuring a performance for the current agents in relation to the performance metric during the transpired portion of the current shift.

The method 500 may then continue, at step 510, via the act of recording the measured performance as current shift performance data.

The method 500 may then continue, at step 515, via the act of providing the staffing plan, the workload forecast, and the current shift performance data as inputs to the predictive model and calculating therewith an actual forecasted target adherence that indicates a likelihood that the threshold score for the service level target will be achieved for the current shift.

The method 500 may then continue, at step 515, via the act of determining whether the actual forecasted target adherence is at least greater than the threshold defined by the acceptable forecasted target adherence and, if so, triggering the performance of the selection routine.

In exemplary embodiments, the trigger routine may be performed repeatedly during a current shift at a regular interval. For example, the regular interval at which the trigger routine may include an interval that is less than 1 minute.

In exemplary embodiments, the trigger routine includes determining whether the actual forecasted target adherence is greater by a predetermined margin than the threshold defined by the acceptable forecasted target adherence. This predetermined margin may be configured so to reflect a differential that can at least absorb the negative performance impact of one of the scheduling perks. In this way, the agent incentivizer only begins calculating proposed scheduling perks if a sufficient margin is available. In exemplary embodiments, the types of scheduling perks may be characterized depending on scheduling impact, for example, a minor scheduling perk may be a 15 minute break, a moderate scheduling perk may be a 30 minute break, and so forth. In such cases, the predetermined margin may be sufficient to at least absorb one of the types of scheduling perks that has the most minimal impact. When the margin becomes greater, the system, at some point, may decide between offering two minor scheduling perks or one moderate scheduling perk, as those may have the same impact. In some cases, the agent incentivizer may perceive offering two minor scheduling perks as being preferable over offering one moderate scheduling perk even if the performance consequences are the same, as more agents receive incentives.

In alternative embodiments, the trigger routine may further include the step of determining an extent to which the actual forecasted target adherence exceeds the threshold defined by the acceptable forecasted target adherence. This differential can then be put to use in selecting between the types of scheduling perks. For example, each of the types of scheduling perks may be associated with a number of lost agent-hours. Then, the selection routine step of selecting one of the types of the scheduling perks as the proposed scheduling perk may include biasing selection toward the scheduling perks having a higher value in terms of associated lost agent-hours when the differential is higher (i.e., when the extent to which the actual forecasted target adherence exceeds the threshold defined by the acceptable forecasted target adherence has a higher value). In the opposite case, that same step may include biasing selection toward ones of the scheduling perks having a lower value in terms of associated lost agent-hours when the differential is lower (i.e., when the extent to which the actual forecasted target adherence exceeds the threshold defined by the acceptable forecasted target adherence has a lower value). The agent incentivizer may run several scenarios for determining the best fit for any given situation. The valuation as to how the best fit is determined may be input by a supervisor, for example, by defining highest value as scenarios that provide incentives to the highest number of agents.

With general reference now to FIGS. 6 and 7, the discussion will now focus on the second type of agent incentivizer that was introduced above. As will be seen, the second type of agent incentivizer includes embodiments that create an dynamic exchange where points earned by the agents are valued in real-time to reflect changing current conditions. The dynamic valuation is tied to the contact center's current standing in relation to how likely it is to satisfy service level targets. The agents are informed of the present valuation of their earned points and allowed to "purchase" scheduling perks in accordance with that valuation. That is, in example embodiments, the agent may control when to use their earned points, which allows agents to wait for advantageous exchange rates or, perhaps, when they're having a bad day and feel like they need a break. For example, an agent who is having a good day may then want to "save" their earned point for a "bad day" rather than be forced to use their points because of a best-fit scenario.

With specific reference now to FIG. 6, a method 600 is provided that illustrates functionality associated with this other type of agent incentivizing tool. As will be appreciated, the method 600 represents another way to incentivize agents of a contact center via scheduling perks. In this case, agents are allowed to track a variable valuation of earned points—such as those earned in gamification systems for high performance—and then allowed to trade the points for scheduling perks when a present valuation makes it most desirable or when their present personal situation makes it more valuable for them. As before, a scheduling perk may be defined as a desirable scheduling change that is applicable during a current shift. Further, as before, the current shift may be defined as an ongoing shift that includes both a transpired portion and remaining portion.

The method 600 may begin, at step 605, via the act of receiving a workload forecast for the current shift. In an exemplary embodiment, the workload forecast may include a prediction as to a total services provided by the current agents over the remaining portion of the current shift as broken down into subtotals of the total services expected to occur within respective subperiods defined within the remaining portion of the current shift.

The method 600 may then continue, at step 610, via the act of receiving a staffing plan listing current agents assigned to work during the current shift.

The method 600 may then continue, at step 615, via the act of receiving data describing a service level target. As before, the service level target defines both a performance metric and a satisfying threshold score in relation to the performance metric. In exemplary embodiments, the performance metric of the service level target may include a performance metric that is objectively measurable and relates to a manner in which an agent of the current agent delivers a service to a given customer during a given interaction. In exemplary embodiments, the service being delivered is conducted by a voice call with the customer, and the performance metric relates to an aspect of the voice call. In exemplary embodiments, a score for the performance metric over the current shift may be calculated as an average of scores derived from respective interactions handled by the current agents over the current shift. In exemplary embodiments, the performance metrics may relate to a predetermined percentage of voice calls answered prior to a predetermined number of rings, a predetermined percentage of chats accepted within a predetermined number of seconds, a predetermined percentage of emails responded to within a predetermined time period, an average handle time for voice calls, and a predetermined percentage of first-call resolutions. The performance metric may include other contact center operational metrics.

The method 600 may then continue, at step 620, via the act of receiving data describing types of the scheduling perks. The types of scheduling perks may include a perk that extends a break period, provides an extra break period, and/or allows for an early end to the current shift. The data describing each type of scheduling perk may include an associated number of lost agent-hours for each.

The method 600 may then continue, at step 625, via the act of performing a valuation routine for determining a value of points earned by the current agents in relation to the current agents trading the points in exchange for receiving the scheduling perks during the current shift. The valuation routine will be described in more detail with reference to the method 700 of FIG. 7.

The method 600 may then continue, at step 630, via the act of performing an offer routine whereby the scheduling perks are offered to one or more of the current agents per the determined value of the points. In an exemplary embodiment, the offer routine includes transmitting an electronic communication to user devices associated with the one or more of the current agents offering the scheduling perks per the determined value of the points. The electronic communication may be included within a chat or text message, a UI element provided within an agent dashboard, an email, a widget, and the like. In exemplary embodiments, the electronic communication offering the scheduling perks may include a listing of at least two of the scheduling perks and, associated with each of the listed scheduling perks, a number of points required in a trade for receiving the scheduling perk during the current shift.

With specific reference now to FIG. 7, a method 700 is shown that illustrates an exemplary embodiment of the valuation routine of FIG. 6.

The method 700 may begin, at step 705, via the act of measuring a performance of the current agents in relation to the performance metric during the transpired portion of the current shift and recording the measured performance as current shift performance data.

The method 700 may then continue, at step 710, via the act of providing the staffing plan, the workload forecast, and the current shift performance data as inputs to the predictive model and calculating therewith an actual forecasted target adherence that indicates a likelihood that the threshold score for the service level target will be achieved for the current shift.

The method 700 may then continue, at step 715, via the act of comparing the actual forecasted target adherence to a threshold defined by the acceptable forecasted target adherence to determine a first parameter. The first parameter may be defined as an extent to which the actual forecasted target adherence exceeds the threshold defined by the acceptable forecasted target adherence.

Alternatively, if the actual forecasted target adherence is found to not exceed the threshold, then the valuation routine may proceed to set the value of the point at an minimum amount. In other embodiments, when the actual forecasted target adherence is found to not exceed the threshold, the offering of scheduling perks may be discontinued. The valuation routine then may be repeated periodically until the actual forecasted target adherence is found to exceed the threshold, in which cast the method continues.

The method 700 may then continue, at step 715, via the act of valuing the earned points according to a direct relationship with the first parameter so that as the first parameter increases the value of the earned points increases. In exemplary embodiments, the points are valued in accordance with a direct proportional relationship with the valuation parameter. Non-linear relationships are also possible.

In exemplary embodiments, the offer routine may include offering the scheduling perk to all of the current agents or a limited number of select agents selected from among the current agents. In exemplary embodiments of the latter case, the select agents may be selected by: determining, from the current agent performance data, relative performance between the current agents in relation to the performance metric during the transpired portion of the current shift; ranking the current agents in relation to the determined relative performance; and based on the ranking, identifying a group of highest performing current agents based on the rankings. The current agents may then be identified as being the group of highest performing current agents.

In exemplary embodiments, the offer routine may communicate to the select agents that only a limited number of a particular scheduling perk is available. The particular scheduling perk may then be given to the first select agents to accept the offer, and the offer may be ended when each of the limited number is claimed. In such cases, the offer routine may further include communicating that the limited number of the particular scheduling perks is available; and then tracking a number of the current agents accepting the offer associated with the particular scheduling perk until the number of current agents accepting is found to equal the limited number available. In response to determining that the number of select agents accepting equals the limited number made available, the method may proceed by sending another electronic communication that notifies the select agents that the particular scheduling perks is no longer available.

In exemplary embodiments, the valuation routine may be performed repeatedly during the current shift at a regular interval so that the value of the points is updated dynamically. In this way, the actual forecasted target adherence is calculated using a most recently recorded version of the current shift performance data. In exemplary embodiments, the regular interval at which the valuation routine is repeated includes an interval that is less than 1 minute. In exemplary embodiments, the offer routine may be performed in response to each completion of the valuation routine so that a most current value of the points is provided in the electronic communication of the offer routine. In this way, the current agents are informed as to the present valuation of the points. The points may include performance points earned by each of the current agents during a previous shift for performance that exceeded a predetermined performance threshold.

The embodiments of the present agent incentivizer may be used to proactively offer scheduling perks to contact center agents. Such offers may be automatically processed as the likely impact on target service levels is already determined and deemed acceptable per approved thresholds. Alternatively, the offers may be proposed to a supervisor for approval before being communicated to agents. In this manner, the most cost-effective, compelling agent incentives may be realized while still ensuring that contact centers satisfy performance objectives. Example embodiments may enable a contact center to make informed, real-time decisions about what schedule changes should be proactively offered to each contact center agent. The automated decisions to offer incentives may reflect up to the moment performance so that high agent performance being realized during the current shift is taken into account. This aspect creates a highly engaging incentive to perform well from the start of the shift, as such performance may lead to extra breaks in the latter portion of the shift. As also provided, a variable valuation of performance points earned by the agents provide another engaging incentive. Agents may track the value of their points in relation to the scheduling perks and then trade the points for perks when the value is in their favor.

As will be appreciated, the present agent incentivizing tool offers several advantages. The automated real-time analysis allows for highly advantageous agent-schedule perk pairings to be identified in real-time so incentives can be offered more proactively and in an informed and intelligent manner. Significantly, contact center operations can be further optimized as the present invention allows near-term SLA/service level targets to be effectively balanced with the long-term agent retention objectives. Too often opportunities to reward agents are missed because those opportunities are not recognized. The present agent incentivizer provides a tool that can eliminate this issue so that rewards that a contact center provides to its most valuable resource—its agents—can be more effectively maximized.

As one skilled in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for incentivizing agents of a contact center with scheduling perks, each scheduling perk comprising a desirable scheduling change applicable during a current shift, wherein the current shift comprises an ongoing shift that includes a transpired portion and a remaining portion, the method comprising the steps of:

training a machine learning algorithm with a neural network architecture based on a regression algorithm and historic contact center data to predict service level target adherence;

receiving a workload forecast for the current shift;

receiving a staffing plan listing current agents assigned to work during the current shift;

receiving data describing a service level target, the service level target defining a performance metric and a satisfying threshold score in relation to the performance metric;

receiving data describing types of the scheduling perks;

performing a selection routine for determining a select scheduling perk for offering to a select agent;

sending an electronic communication to a user device associated with the select agent that communicates an offer to the select agent of the select scheduling perk; and performing a trigger routine that selectively allocates shared computational resources for execution as a function of one or more monitored conditions for triggering performance of the selection routine;

wherein the selection routine comprises the steps of:

selecting one of the types of the scheduling perks as a proposed scheduling perk and selecting one of the current agents as a proposed agent;

modifying the staffing plan to create a proposed staffing plan that reflects the proposed agent taking the proposed scheduling perk during the remaining portion of the current shift;

providing the proposed staffing plan and the workload forecast as inputs to a predictive model that utilizes the machine learning algorithm that is trained on historic data of the contact center and predicting therewith a proposed forecasted target adherence that indicates a likelihood that the threshold score for the service level target will be achieved for the current shift;

determining whether the proposed forecasted target adherence satisfies a threshold defined by an acceptable forecasted target adherence and, if so, deeming the proposed scheduling perk as the select scheduling perk and the proposed agent as the select agent;

wherein the trigger routine comprises the steps of:

measuring a performance for the current agents in relation to the performance metric during the transpired portion of the current shift;

recording the measured performance as current shift performance data;

providing the staffing plan, the workload forecast, and the current shift performance data as inputs to the predictive model and calculating therewith, and based on the machine learning algorithm, an actual forecasted target adherence that indicates a likelihood that the threshold score for the service level target will be achieved for the current shift;

determining whether the actual forecasted target adherence is at least greater than the threshold defined by the acceptable forecasted target adherence and, if so, triggering the performance of the selection routine;

wherein the trigger routine is performed repeatedly during the current shift at a regular interval;

wherein the received data that describes the types of the scheduling perks comprises a lost agent-hours associated with each of the scheduling perks;

wherein the trigger routine further includes the step of determining an extent to which the actual forecasted target adherence exceeds the threshold defined by the acceptable forecasted target adherence; and wherein the selection routine step of selecting one of the types of the scheduling perks as the proposed scheduling perk comprises:

biasing selection toward ones of the scheduling perks having a higher value in terms of lost agent-hours when the extent to which the actual forecasted target adherence exceeds the threshold defined by the acceptable forecasted target adherence comprises a higher value; and biasing selection toward ones of the scheduling perks having a lower value in terms of lost agent-hours when the extent to which the actual forecasted target adherence exceeds the threshold defined by the acceptable forecasted target adherence comprises a lower value.

2. The method of claim 1, wherein the regular interval at which the trigger routine is performed comprises an interval that is less than 1 minute.

3. The method of claim 1, wherein the trigger routine includes the step of determining whether the actual forecasted target adherence is at least greater than the threshold defined by the acceptable forecasted target adherence comprises:

determining whether the actual forecasted target adherence is greater by a predetermined margin than the threshold defined by the acceptable forecasted target adherence.

4. The method of claim 1, wherein the selection routine further includes providing the current shift performance data as an input to the predictive model for use in predicting the proposed forecasted target adherence.

5. The method of claim 4, wherein the performance metric of the service level target comprises a performance metric that is objectively measurable and relates to a manner in which an agent of the current agents delivers a service to a given customer during a given interaction.

6. The method of claim 5, wherein the service being delivered is conducted by a voice call with the customer, and the performance metric relates to an aspect of the voice call.

7. The method of claim 5, wherein a score for the performance metric over the current shift is calculated as an average of scores derived from respective interactions handled by the current agents over the current shift.

8. The method of claim 5, wherein the performance metric comprises at least one of: a predetermined percentage of voice calls answered prior to a predetermined number of rings; a predetermined percentage of chats accepted within a predetermined number of seconds; a predetermined percentage of emails responded to within a predetermined time period; an average handle time for voice calls; and a predetermined percentage of first-call resolutions; and wherein the types of scheduling perks include an extension of a break period, an extra break period, and an early end of the current shift.

9. The method of claim 1, further comprising the step of:

receiving the acceptable forecasted target adherence as a user input from a user device associated with a supervisor of the contact center;

wherein the workload forecast includes a prediction as to a total services provided by the current agents over the remaining portion of the current shift as broken down into subtotals of the total services expected to occur within respective subperiods defined within the remaining portion of the current shift.

10. The method of claim 1, further comprising the step of:

measuring a performance for how each of the current agents has performed in relation to the performance metric during the transpired portion of the current shift; and ranking the current agents in relation to the measured performance;

wherein the selection routine step of selecting the one of the current agents as the proposed agent comprises selecting the one of the current agents because the one of the current agents ranks higher than at least a majority of the other current agents in the ranking of current agents.

11. The method of claim 10, wherein the selection routine step of selecting the one of the current agents as the proposed agent comprises selecting the one of the current agents because the one of the current agents is ranked highest amount the current agents in the ranking.

12. The method of claim 1, wherein, if the proposed forecasted target adherence is determined to not satisfy the threshold defined by the acceptable forecasted target adherence, the selection routine is repeated using at least one of: an alternative one of the types of the scheduling perks as the proposed scheduling perk; or an alternative one of the current agents as the proposed agent.

13. The method of claim 1, further comprising the steps of:

receiving a reply electronic communication from the user device of the select agent indicating that the select agent accepts the offered scheduling perk;

wherein, in response to receiving the reply electronic communication accepting the offer, the staffing plan is automatically updated to reflect that a work schedule of the select agent during the current shift includes the select scheduling perk.

14. The method of claim 1, further comprising the steps of:

receiving a reply electronic communication from the user device of the select agent indicating that the select agent declines the offered scheduling perk;

wherein, in response to receiving the reply electronic communication declining the offer, the selection routine is repeated using the same proposed scheduling perk and an alternative one of the current agents as the proposed agent.

15. A system for incentivizing agents of a contact center with scheduling perks, each scheduling perk comprising a desirable scheduling change applicable during a current shift, wherein the current shift comprises an ongoing shift that includes a transpired portion and a remaining portion, the system comprising:

a processor; and a memory storing instructions which, when executed by the processor, cause the processor to perform the steps of:

training a machine learning algorithm with a neural network architecture based on a regression algorithm and historic contact center data to predict service level target adherence;

receiving a workload forecast for the current shift;

receiving a staffing plan listing current agents assigned to work during the current shift;

receiving data describing a service level target, the service level target defining a performance metric and a satisfying threshold score in relation to the performance metric;

receiving data describing types of the scheduling perks;

performing a selection routine for determining a select scheduling perk for offering to a select agent;

sending an electronic communication to a user device associated with the select agent that communicates an offer to the select agent of the select scheduling perk; and performing a trigger routine that selectively allocates shared computational resources for execution as a function of one or more monitored conditions for triggering performance of the selection routine;

wherein the selection routine comprises the steps of:

selecting one of the types of the scheduling perks as a proposed scheduling perk and selecting one of the current agents as a proposed agent;

modifying the staffing plan to create a proposed staffing plan that reflects the proposed agent taking the proposed scheduling perk during the remaining portion of the current shift;

providing the proposed staffing plan and the workload forecast as inputs to a predictive model that utilizes the machine learning algorithm that is trained on historic data of the contact center and predicting therewith a proposed forecasted target adherence that indicates a likelihood that the threshold score for the service level target will be achieved for the current shift;

determining whether the proposed forecasted target adherence satisfies a threshold defined by an acceptable forecasted target adherence and, if so, deeming the proposed scheduling perk as the select scheduling perk and the proposed agent as the select agent;

wherein the trigger routine comprises the steps of:

measuring a performance for the current agents in relation to the performance metric during the transpired portion of the current shift;

recording the measured performance as current shift performance data;

providing the staffing plan, the workload forecast, and the current shift performance data as inputs to the predictive model and calculating therewith and based on the machine learning algorithm, an actual forecasted target adherence that indicates a likelihood that the threshold score for the service level target will be achieved for the current shift;

determining whether the actual forecasted target adherence is at least greater than the threshold defined by the acceptable forecasted target adherence and, if so, triggering the performance of the selection routine;

wherein the trigger routine is performed repeatedly during the current shift at a regular interval;

wherein the received data that describes the types of the scheduling perks comprises a lost agent-hours associated with each of the scheduling perks;

wherein the trigger routine further includes the step of determining an extent to which the actual forecasted target adherence exceeds the threshold defined by the acceptable forecasted target adherence; and wherein the selection routine step of selecting one of the types of the scheduling perks as the proposed scheduling perk comprises:

biasing selection toward ones of the scheduling perks having a higher value in terms of lost agent-hours when the extent to which the actual forecasted target adherence exceeds the threshold defined by the acceptable forecasted target adherence comprises a higher value; and biasing selection toward ones of the scheduling perks having a lower value in terms of lost agent-hours when the extent to which the actual forecasted target adherence exceeds the threshold defined by the acceptable forecasted target adherence comprises a lower value.

16. The system of claim 15, wherein the regular interval is less than 1 minute; and wherein the performance metric of the service level target comprises a performance metric that is objectively measurable and relates to a manner in which an agent of the current agents delivers a service to a given customer during a given interaction.

17. The system of claim 16, wherein the service being delivered is conducted by a voice call with the customer, and the performance metric relates to an aspect of the voice call, and wherein a score for the performance metric over the current shift is calculated as an average of scores derived from respective interactions handled by the current agents over the current shift; and wherein the types of scheduling perks include an extension of a break period, an extra break period, and an early end of the current shift.

* * * * *